Figure 1:
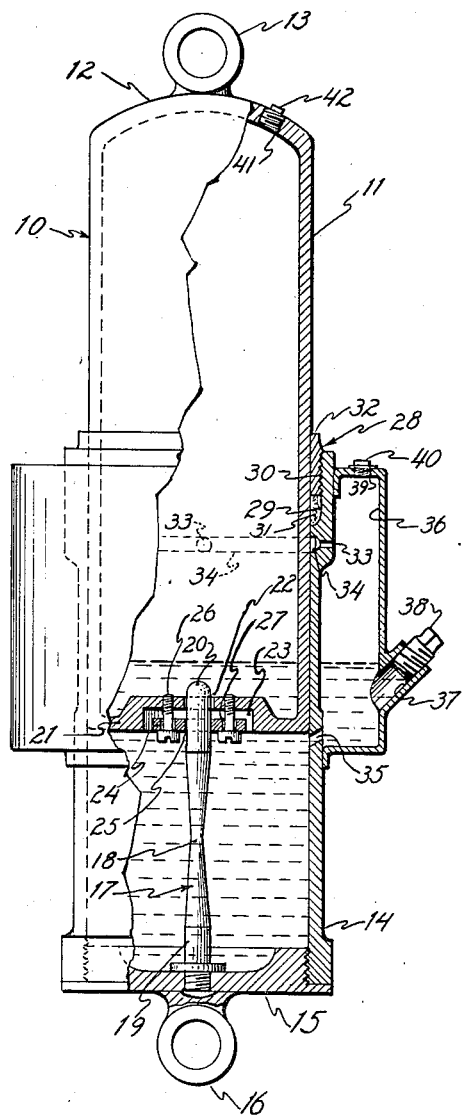

Sept. 1, 1936.   R. A. SWALM   2,053,053
AIRCRAFT LANDING GEAR
Filed July 30, 1932

INVENTOR
Robert A. Swalm
BY
ATTORNEY

Patented Sept. 1, 1936

2,053,053

UNITED STATES PATENT OFFICE 2,053,053

AIRCRAFT LANDING GEAR

Robert A. Swalm, Buffalo, N. Y., assignor to Curtiss Aeroplane & Motor Company, Inc., a corporation of New York Application July 30, 1932, Serial No. 626,393

4 Claims. (Cl. 267—64)

This invention relates to aircraft landing gears, and more particularly to improvements in air-hydraulic shock absorbing struts for embodiment in aircraft landing gears.

The usual aircraft landing gear comprises one or several struts pivoted to the body of the aircraft, certain of the struts depending from the aircraft and having attached at their lower extremities a stub axle and a wheel for ground contact. At the upper ends of the struts provision is made for a shock absorbing mechanism to absorb the impact of landing and to provide a resilient support, acting as a spring when the airplane travels over rough, uneven ground, thereby absorbing ground shocks and preventing their transmission from the ground to the body of the aircraft. My invention is particularly concerned with an improved form of an oleo or hydraulic shock absorbing strut. Some shock absorbing struts in the past have combined the advantages to be derived from hydraulic action for shock absorption, and the resilient action of compressed air for aiding in shock absorption and for giving a resilient action to the strut. It has previously been found necessary to use air under considerable pressure in such struts, resulting in mechanical difficulties in the sealing of this compressed air within the shock absorber. It is well known that air or fluid under pressure will gradually leak through the smallest openings, and with the packing glands usually incorporated in such absorbers, retention of air pressure or the full quantity of fluid over a long period of time has been difficult. Service conditions in operation make it inconvenient to determine whether such air pressure is adequate, or whether there is sufficient fluid in the strut to insure safety.

An object of my invention is to provide a hydro-pneumatic shock absorbing strut in which the air pressure is substantially atmospheric when the shock absorbing strut is extended. By this arrangement, sealing of the shock absorbing strut against loss of air pressure becomes a minor problem rather than a major problem.

An additional object of my invention is to provide a novel form of packing gland with pressure relief passages so that the packing is at no time subjected to excessive pressures, thereby lengthening its life and increasing its efficiency in eliminating loss of hydraulic fluid from the shock absorbing strut.

A further object of my invention is to provide a reservoir for hydraulic fluid which automatically allows additional fluid to pass into the shock absorbing strut to make up for any slight loss that might occur through the packing gland.

A further object of my invention is to provide a novel form of valve to regulate the speed of action of the shock absorbing strut under load. In addition, this valve provides for high resistance to motion of the shock absorber at extreme positions of adjustment, preventing damage to the shock absorbing strut when severe pressures are imposed upon it while the shock absorbing strut is in an extreme position of adjustment.

A further object of the invention is to provide a novel form of relief valve in the hydraulic mechanism, whereby high impact stresses serve to automatically retard the rapid compression of the shock absorbing strut, and whereby restitution of the shock absorbing strut to an extended position may be effected without a restriction of the flow of the hydraulic fluid.

An additional object is to provide an air cushion for supporting the weight of the aircraft when it is traveling over the ground, and to so arrange the mechanism that impact stresses are largely assumed by hydraulic action, while taxiing stresses are largely assumed by the air cushion.

Figure 2:
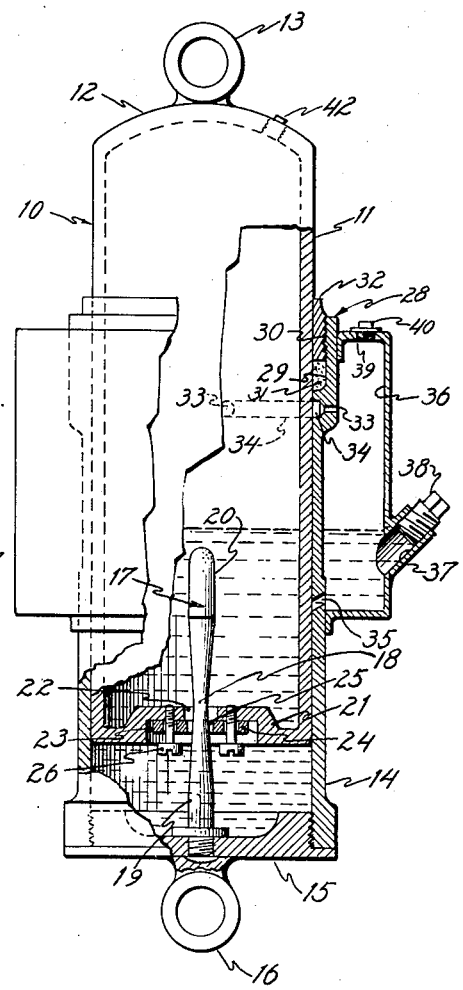

In the drawing, wherein similar reference characters designate similar parts,

Fig. 1 is a view partly in section and partly in elevation, showing the details of construction of the shock absorbing strut; and Fig. 2 is a view similar to Fig. 1 showing the shock absorbing strut in a partially compressed condition.

The shock absorbing strut 10 comprises a plunger 11 having a closure 12 at its upper end. To the closure is attached an eye 13 for attachment of the shock absorbing strut to the aircraft. The plunger 11 is adapted to slide within a cylinder 14, having at its bottom end a closure 15 provided with an eye 16 for attachment to the landing gear of the aircraft. Suitable means external of the shock absorbing strut 10 or in conjunction therewith may be supplied to limit the extension of the eyes 13 and 16 so that the plunger 11 is at all times retained within the cylinder 14.

The closure 15 of the cylinder 14 carries a metering pin 17 extending into the cylinder along its axis. The metering pin 17 is tapered to a small diameter at its mid portion 18, or is otherwise constructed so that the cross sectional area of the mid portion 18 is substantially less than the end portions 19 and 20. A bulkhead 21 is rigid with the lower end of the plunger 11, and has formed therein an orifice 22 of slightly greater diameter than the end portions 19 and 20 of the metering pin 17. In the extended position of adjustment of the shock absorbing strut 10, the end portion 20 of the metering pin 17 lies within the orifice 22. Upon compression of the shock absorbing strut, the plunger 11 telescopes within the cylinder 14 and the bulkhead 21 slides down over the metering pin 17, as shown in Fig. 2, whereupon the effective area of the orifice 22 is increased as it embraces the smaller mid portion 18 of the metering pin 17. The effective area of the orifice 22 is thus gradually decreased as it approaches the enlarged portion 19 of the metering pin 17. The cylinder 14, and part of the plunger 11, are filled with fluid in a manner to be later described.

The bulkhead 21 has formed therein an annular recess 23, just below the orifice 22. A disc flap valve 24, having an opening 25 of slightly larger diameter than the portion 20 of the metering pin 17 and of slightly smaller diameter than the orifice 22, surrounds the metering pin. The valve 24 is retained against the bulkhead 21 by means of screws 26 engaging in holes 27 in the valve. The screws 26 allow the valve 24 to move against the bulkhead 21 or away from it according to the direction of flow of the fluid through the orifice 22. As compressive stresses are applied to the eyes 13 and 16, the plunger 11 starts to move into the cylinder 14, thereby exerting pressure on the fluid within the cylinder 14 and tending to force it through the orifice 22. This flow of fluid likewise causes a pressure to be exerted on the lower surface of the valve 24, causing it (the valve) to move against the bulkhead 21, further restricting the effective area through which the fluid may pass. Accordingly, the only passage for the fluid is that provided by the opening 25 and the orifice 22, restricted by the metering pin 17. By this action, great resistance is built up to the movement of fluid from the cylinder 14, and the telescoping of the plunger 11 with respect to the cylinder 14 is thereby retarded. As the motion progresses, the smaller tapered portion of the metering pin is made to coincide with the opening 25 and the orifice 22 and the flow of fluid through the then enlarged opening is thereby allowed to increase, whereupon telescoping motion of the plunger 11 within the cylinder 14 accelerates. After the portion 18 of the metering pin 17 passes beyond the openings 22 and 25, resistance of flow again cumulatively increases as the openings approach the portion 19 of the metering pin 17, at which time the maximum imposed shocks upon the mechanism will have been effectively damped. As the fluid within the cylinder 14 is moved through the orifice 22 and the opening 25, the air trapped within the plunger 11 is compressed, and upon cessation of the externally applied compressive stresses, the resilient action of the compressed air will tend to eject the fluid from the plunger 11 and effect restitution of the shock absorbing strut 10 to its extended position. Upon initiation of such restitutional force, the pressure of fluid on the upper side of the bulkhead 21, passing through the orifice 22, causes the flap valve 24 to snap back against the heads of the screws 26 allowing for freer flow of the fluid through the orifice 22 alone. The restitutional effect continues until the shock absorbing strut 10 is again returned to its extended position as in Fig. 1.

Briefly summarizing the action of the shock absorbing strut 10, the metering pin 17 may be said to prevent excessively fast movement of the fluid and hence of the plunger 11 with respect to the cylinder 14 at extreme positions of travel in either direction. The flap valve 24 furnishes an additional restriction to the passage of fluid with a resultant retarding effect upon the speed of compression of the shock absorbing strut, this additional restriction being relieved upon extension of the strut. When the airplane rests or rolls on the ground, the shock absorbing strut 10 assumes a position as in Fig. 2, the air compressed within the plunger 11 balancing the weight or compressive force imposed on the strut.

The construction and action of the packing gland 28 and its associated parts carried by the cylinder 14 and engaging the plunger 11 will now be described. In the upper portion of the cylinder 14 is an annular groove 29 having an upper threaded portion 30. Suitable packing material 31 is placed within the annular groove 29 around the plunger 11, this packing being being retained in proper position by a packing nut 32 screwed into the threads 30. Just below the annular groove 29, a series of openings or ports 33 is formed in the wall of the cylinder 14, which openings may be connected by an annular groove 34. The groove 34 is at all times covered by the plunger 11. At some distance below the openings 33 is an additional port or opening 35 also formed in the wall of the cylinder 14. The port 35 is located at such a position that it allows communication between the inside of the cylinder 14 and the outside of said cylinder when the plunger 11 is in its extended position. Immediately upon movement of the plunger 11 within the cylinder 14, the plunger covers the port 35. Around the outside of the cylinder 14 an annular reservoir 36 is formed, said reservoir having a height sufficient to embrace the openings 33 and 35. The reservoir 36 is fitted with a filler opening 37 into which a plug 38 may be screwed. At the upper end of the reservoir 36 a threaded vent opening 39 is formed into which a plug 40 may be screwed. Reverting to the plunger 11, a threaded vent opening 41 is formed at the upper portion thereof, into which is screwed a plug 42.

In filling the shock absorbing strut with fluid, the plugs 38, 40 and 42 are removed and hydraulic fluid is poured into the opening 37 until the fluid level reaches said opening. In filling, the fluid passes through the port 35, completely filling the lower portion of the cylinder 14, and as the level is increased, a certain amount of the fluid passes through the orifice 22 so that the final level of fluid within the reservoir 36, the cylinder 14 and the plunger 11, is equal. The vent openings 39 and 41 admit of the escape of air as the fluid enters and displaces air from the compartments in which these openings are formed. Upon filling of the shock absorbing strut 10 to the proper level, the plugs 38, 40, and 42 are tightly screwed in, whereupon the air within the reservoir 36 and within the plunger 11 is sealed, under atmospheric pressure. The shock absorbing strut is then in condition for operation.

As telescoping action of the plunger 11 within the cylinder 14 takes place, as previously described, the port 35 is closed by the plunger 11 and the pressure of air and fluid within the shock absorbing strut tends to cause creepage of fluid in the small clearance space between the inner wall of the cylinder 14 and the outer wall of the plunger 11. This creepage progresses as far as the opening 33, whereupon the fluid passes through the opening 33 and into the reservoir 36, the pressure in the reservoir 36 having been maintained at atmospheric upon closing of the port 35 by the plunger 11. Hence, the fluid pressure within the shock absorbing strut 10 cannot be transmitted above the opening 33, and, since the packing gland 28 is above the level of the opening 33, the packing gland 28 is isolated from high pressure, and hence, from leakage.

Upon restitution of the shock absorbing strut to its extended position, the opening 35 is again uncovered by the plunger 11 and an atmospheric pressure balance is automatically effected between the air and fluid in the reservoir 36, and the air and fluid within the cylinder 14 and the plunger 11. Over a period of time, while the shock absorbing strut 10 is in an extended position during flight, a slight seepage of air may take place between the packing gland 28 and the plunger 11, which is transmitted into the reservoir 36 through the opening 33, thereby automatically establishing a balanced atmospheric pressure condition within the shock absorbing strut, which pressure balance may have become slightly upset during rapid action of the shock absorbing strut while the aircraft was taxiing and taking off.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In a hydraulic shock absorber capable of deflection and extension, a cylinder, a hollow plunger slidable in said cylinder, a reservoir carried by said cylinder and open to the interior thereof toward one end thereof and also open thereto intermediate the length thereof, said plunger being adapted at all times to close said end opening, and being adapted to open said intermediate opening only when said shock absorber strut is extended.

2. In a substantially vertical hydro-pneumatic shock absorber, a cylinder, a hollow plunger adapted to slide within said cylinder and having an opening in its lower end through which fluid is adapted to pass, a reservoir encircling the upper end of said cylinder said cylinder having an upper internal annular groove and openings leading to said reservoir and having lower openings leading to said reservoir, said plunger being adapted in its extended position to cover said groove and to uncover said lower openings, and in its telescoped position, to cover said groove and said lower openings; a packing gland at the upper end of said cylinder above said groove engaging said plunger, and means carried by said reservoir for allowing said reservoir and said cylinder to be filled to a predetermined level.

3. In a hydro-pneumatic shock absorber including a hollow plunger slidable in a cylinder, packing means carried by said cylinder for engagement with said plunger, said cylinder having an opening in its wall below said packing adapted to be covered by said plunger in all positions of contraction or expansion of the shock absorber, and a reservoir adjacent said cylinder with which said opening communicates at all times, said opening serving to allow fluid flow from between said cylinder and plunger to said reservoir whereby pressures generated between said cylinder and said plunger are prevented from reaching said packing.

4. In a hydro-pneumatic shock absorber strut having a hollow plunger slidable within a cylinder, said plunger having a head and a metering orifice therein through which fluid is adapted to flow from said cylinder upon compression of said strut, means for maintaining the fluid level within said strut comprising a fluid reservoir carried by said cylinder, said cylinder having a wall opening just below the plunger head when the latter is extended, said opening allowing, when said strut is extended, free fluid flow between said cylinder and said reservoir, and a packing gland on said cylinder engaging said plunger, said cylinder having a second opening communicating with said reservoir at a point along the wall of said cylinder which is covered by said plunger in all positions of adjustment thereof, said second opening forming a relief to by-pass fluid under high pressure to said reservoir.

ROBERT A. SWALM.